United States Patent [19]
Sheldon

[11] 4,104,796
[45] Aug. 8, 1978

[54] FILAMENT-TYPE TRIMMER
[75] Inventor: John D. Sheldon, Charlotte, N.C.
[73] Assignee: Textron Inc., Providence, R.I.
[21] Appl. No.: 820,531
[22] Filed: Jul. 29, 1977
[51] Int. Cl.$^2$ ............................................ A01D 55/18
[52] U.S. Cl. ........................................ 30/276; 56/295
[58] Field of Search ................... 30/276, 347; 56/12.7, 56/295; 51/335

[56] References Cited
U.S. PATENT DOCUMENTS

| 2,771,721 | 11/1956 | Reiman | 51/335 |
|---|---|---|---|
| 2,854,798 | 10/1958 | DeHaven | 51/335 |
| 3,826,068 | 7/1974 | Ballas et al. | 56/295 |
| 3,928,911 | 12/1975 | Pittinger | 30/276 |
| 4,007,525 | 2/1977 | Utter | 30/276 |
| 4,043,103 | 8/1977 | Lakin et al. | 56/295 |

Primary Examiner—Jimmy C. Peters
Attorney, Agent, or Firm—Robert E. Burns; Emmanuel J. Lobato; Bruce L. Adams

[57] ABSTRACT

A filament-type trimmer comprises at least one filament spool carried by a rotary housing driven by a motor the speed of which increases with decrease in load. Means for normally restraining rotation of the filament spool relative to the casing is responsive to centrifugal force to release the spool to feed additional filament when the speed of the motor increases due to a decrease in load by reason of the extending end of the filament having become shorter by wearing or breaking off. In one embodiment the feed of additional filament is delayed until by manual control the speed is reduced below normal operating speed.

8 Claims, 15 Drawing Figures

FILAMENT-TYPE TRIMMER

FIELD OF INVENTION

The present invention relates to filament type trimmers and particularly to means for automatically feeding the filament to compensate for filament that is worn or broken off so as to maintain an approximately constant length of filament.

BACKGROUND OF THE INVENTION

A filament type trimmer for cutting vegetation such as grass and weeds and particularly for trimming along walks, fences and flower beds and around trees comprises a motor driven rotary head comprising a housing carrying one or more spools of synthetic monofilament an end portion of which extends out through a guide provided on the head. As the head rotates at high speed, the projecting end portion extends out from the head by centrifugal force and serves as a cutting "blade".

The spool of filament is rotatably mounted on the housing so as to supply additional filament as the projecting end portion of the filament is worn or broken off. However, as the pull on the filament resulting from centrifugal force acting on the projecting end portion of the filament tends to rotate the spool relative to the housing to unwind the filament, means must be provided for holding the spool against rotation relative to the housing except when it is desired to feed more filament. Thus it has been proposed to provide means for locking the filament spool against rotation. When it is desired to supply more filament, the trimmer is stopped and held in inverted position so that the spool can be manually released and rotated to unwind the desired amount of filament from the spool.

To avoid the need of stopping the trimmer to adjust the filament length, it has been proposed to supply filament from a stationary coil which is concentric with the rotary head. The coil is fed through clamping jaws which are releasable by means of a manually operable release rod while the trimmer is running so that additional filament is pulled out from the coil by centrifugal force acting on the projecting end poriton of the filament. However, with this arrangement it is not possible to tell how much filament is being fed out.

To overcome this disadvantage it has been proposed to release the filament by increments in the manner that only a predetermined amount of filament is released each time the trigger is pulled. However, the operation still depends on the judgement of the operator as to when additional filament is required.

SUMMARY OF THE INVENTION

It is an object of the present invention to overcome the disadvantages of filament trimmers heretofore available by providing means for automatically supplying additional filament when it is needed.

In accordance with the invention, the rotary head is driven by a motor having such load-speed characteristics that the speed of rotation increases when the load on the motor decreases. The load on the motor depends on the length of the projecting end portion of the filament. Hence when the length of the projecting end portion of the filament decreases as a result of a portion of the filament being worn or broken off, the load on the motor decreases and the speed increases. In accordance with the invention this increase of speed is used to control means for feeding additional filament so that normal filament length and normal speed are restored.

In one embodiment of the invention a spool of filament which rotates with the cutting head is normally held against rotation by catch means which is responsive to centrifugal force. When the speed of rotation of the cutting head increases by reason of the projecting end of the filament having become shorter, the catch is released to feed out additional filament. Means may be provided for controlling the rate at which additional filament is fed so as to provide time for the motor to slow down due to the increase load imposed by the increased length of filament. To avoid too much filament being fed at one time, the catch means may release the filament spool to turn only a predetermined amount each time it is released. Moreover, to avoid increasing the length of the filament and thereby increasing the cutting radius of the trimmer while it is cutting, the feed of filament may be delayed until the speed of the motor has by manual control been reduced below normal operating speed.

Another mode of controlling rotation of the filament spool relative to the cutting head to feed additional filament is by torque responsive means. Since the pull of the filament by reason of centrifugal force acting on the projecting end portion is represented by the formula $$F = mrw^2 \tag{1}$$

where $F$ = force, $m$ = mass of the body, $r$ = the radius of the body which is rotating and $w$ = angular volocity at which it is rotating, the pull of the filament increases by reason of the increased speed even though the length and hence the weight of the filament becomes less. Hence, if the spool is held by torque responsive means having a predetermined threshold, additional filament will be fed out when the torque resulting from the pull of the filament exceeds the set threshold value. In order to provide time for the motor to slow down as additional filament is fed out, means is provided for controlling the rate of filament feed.

BRIEF DESCRIPTION OF DRAWINGS

The nature, objects and advantages of the invention will be more fully understood from the following description of preferred embodiments illustrated by way of example in the accompanying drawings in which.

DESCRIPTION OF PREFERRED EMBODIMENTS

Figure 1:
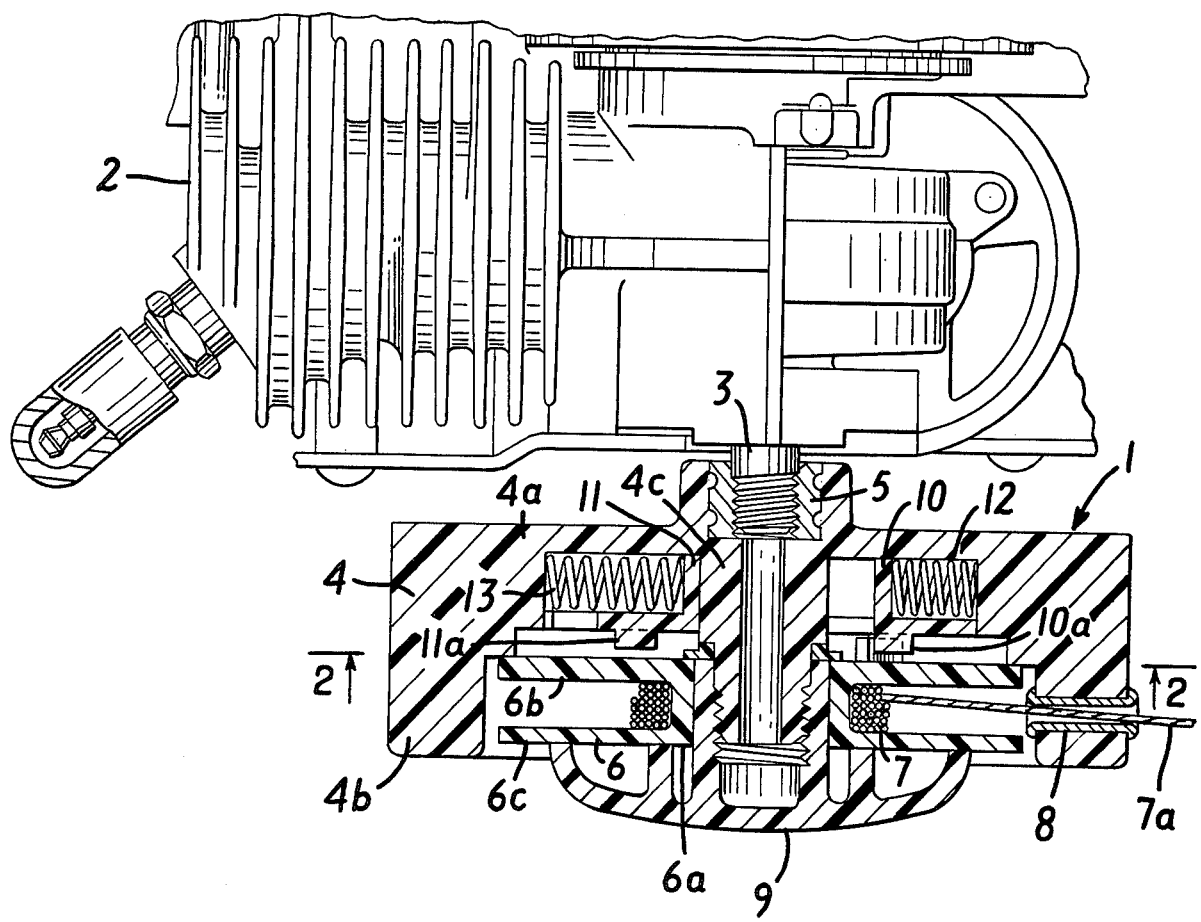
FIG. 1 is an axial section of a filament-type trimmer in accordance with the present invention driven by an internal combustion engine of which a portion is schematically shown.

A filament-type trimmer in accordance with the present invention as illustrated by way of example in FIGS. 1 to 4 comprises a rotary cutting head 1 driven by a motor 2 shown by way of example as a single cylinder two stroke cycle internal combustion engine having a drive shaft 3. The cutting head 1 is shown as comprising a circular body portion or casing 4 having a base portion 4a and a downwardly extending rim portion 4b. The casing 4 is conveniently molded of plastic material and provided with a central internally threaded metal bushing 5 which is screwed onto the threaded end of the motor drive shaft 3 to secure the cutting head removably to the motor.

The casing 4 has a central downwardly projecting stud portion 4c on which a filament spool 6 is rotatably mounted coaxially with the casing. The spool 6 has a hub portion 6a and opposite flanges 6b and 6c. A monofilament 7 is wound on the spool and has an end portion 7a which extends through a guide 8 in the flange portion 4b to the exterior of the casing. The spool 6 is retained in the casing by a cap or cover 9 which screws onto a threaded lower end of the central projection 4c of the casing.

In operation the cutting head 1 comprising the casing 4, spool 6, filament 7 and cap 9 is rotated by the motor 2 at a suitable speed for example 6,000RPM. By reason of centrifugal force, the projecting end portion 7a of the filament 7 extends outwardly of the casing and constitutes a cutting element for severing grass, weeds or other vegetation in its path. The filament spool 6 normally rotates together with the casing 4. However, as the tip portion of the filament is worn or broken off by impact with the vegetation being cut or with stones, sticks or other objects in its path, it is desirable to rotate the filament spool 6 relative to the casing 4 in order to feed out additional filament.

Centrifugal force acting on the projecting outer end portion 7a of the filament exerts a pull on the filament and this exerts a torque on the spool 6 tending to cause the filament to unwind. It is hence necessary to hold the spool 6 against rotation relative to the casing 4 except when it is desirable to feed out additional filament so as to restore the normal length of the projecting end portion 7a. In accordance with the present invention means is provided for controlling rotation of the filament spool 6 relative to the casing 4 so as to feed out additional filament as required to maintain the length of the projecting portion 7a substantially constant.

In carrying out the present invention, the motor used for driving the cutting head has the characteristic that its speed varies with the load according to the following equation:

$$RPM = HP/T \times C \quad (2)$$

where RPM represents engine speed, HP represents the horsepower of the engine, T represents the torque imposed by the load on the engine and C is a constant. The torque required to drive the cutting head varies with the length of the projecting end portion 7a of the filament. If the filament becomes shorter by reason of a tip portion wearing or breaking off, the torque required to drive the cutting head decreases and accordingly engine speed increases according to equation (2). In accordance with the present invention this increase in speed is utilized to permit rotation of the filament spool as to feed out additional filament and thereby restore the normal length of the projecting end portion of the filament.

In the embodiment of the invention illustrated by way of example in FIGS. 1 to 4, rotation of the filament spool 6 relative to the casing 4 is controlled by a low speed slider 10 and a high speed slider 11. The sliders 10 and 11 are slidable in radially extending slots in the base portion 4a of the casing 4 immediately above the filament spool 6. The sliders 10 and 11 are biased radially inwardly by coil springs 12 and 13 respectively. By reason of rotation of the casing 4, centrifugal force acts on the sliders 10 and 11 so as to move them radially outwardly against the bias of the respective springs at predetermined speeds of rotation. The springs 12 and 13 are calibrated with respect to the weight of the respective slider so as to determine the rotational speed at which the slider is moved outwardly by centrifugal force. The spring 13 of slider 11 is stronger relative to the weight of the slider than the spring 12 of slider 10 so that the low speed slider 10 will move radially outwardly at a lower speed than the high speed slider 11.

Figure 2:
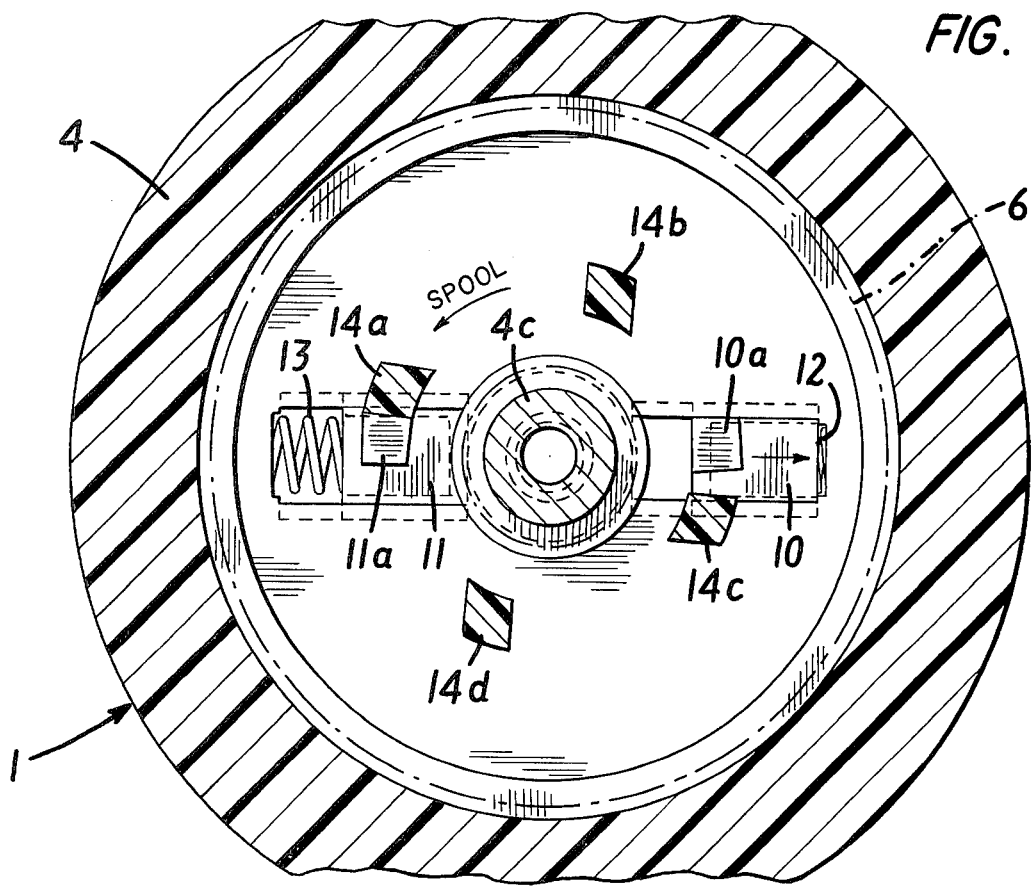
FIG. 2 is a partial cross section taken approximately on the line 2—2 in FIG. 1, FIGS. 3 and 4 are partial cross sections corresponding to FIG. 2 but showing different operative positions.
Figure 3:
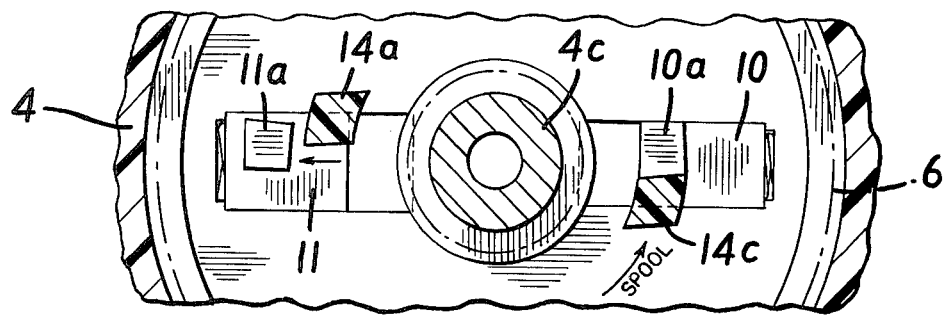
Figure 4:
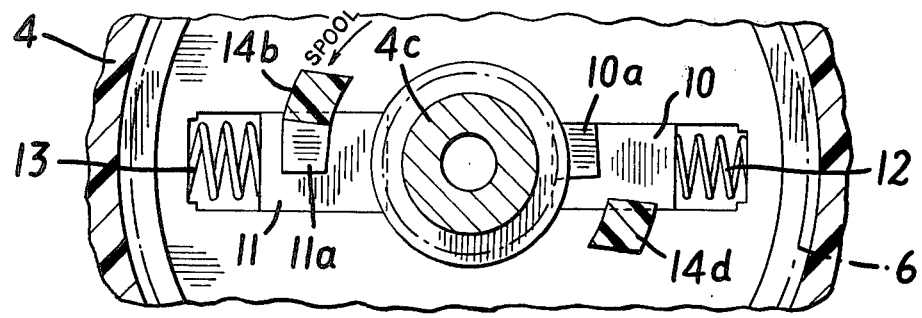

The low speed slider 10 is provided with a downwardly extending projection 10a which in the outer position of the slider is engageable with one or another of upwardly extending projections 14a – 14d provided on the upper flange 6b of the filament spool 6. The high speed slider 11 is provided with a downwardly extending projection 11a which in the inner position of the slider is engageable with one or another of the projections 14a – 14d on the spool. By way of example the springs 12 and 13 are calibrated so that when the cutting head 1 is rotating at a speed below 3,000RPM both sliders are in their inner positions, at 3,000 to 9,000RPM the low speed slider 10 has moved to its outer position while the high speed slider 11 is still in its inner position and above 9,000RPM both sliders are in their outer positions. It will be understood that different speeds can be selected by suitable calibration of the springs with respect to the weights of the slider. When the cutting head 1 is rotating at normal operating speed for example within the range of 3,000 to 9,000RPM the projection 11a of the high speed slider engages one of the projections on the filament spool, for example projection 14a as shown in FIG. 2, so as to hold the spool against rotation relative to the casing. If the speed of rotation increases above 9,000RPM (by reason of the projecting end portion 7a of the filament having become shorter) the high speed slider moves outwardly against the bias of its spring to the position shown in FIG. 3 so that the projection 11a of the slider disengages the projection 14a on the spool. However, the projection 10a of the low speed slider 10 is in the path of travel of the projections on the spool so that the spool is permitted to rotate only until another projection 14c on the spool engages the projection 10a of the low speed slider 10 as illustrated in FIG. 3. Further rotation of the filament spool relative to the cutting head is delayed until, by manual control of the motor, the speed of rotation of the cutting head is reduced to idling speed for example below 3,000RPM. Both of the sliders 10 and 11 thereupon are moved to their inner positions by the bias of the respective springs whereupon the projection 10a of slider 10 is disengaged from projection 14c on the spool so that the spool is permitted to rotate in a counterclockwise direction as viewed in FIGS. 2 – 4 until the next projection 14b on the spool engages the projection 11a on slider 11 as illustrated in FIG. 4. This delay in feeding additional filament avoids sudden increase in the length of the filament and corresponding increase in the cutting radius of the trimmer while the cutting head is rotating at high speed. Hence if the user is trimming close to a flower bed, possible damage to the flowers is avoided. As a trimmer of this kind is usually operated for only short periods of time between idling periods, the cycle of operations described above for restoring the normal length of the projecting end portion of the filament occurs automatically and without any special attention on the part of the operator.

Figure 5:
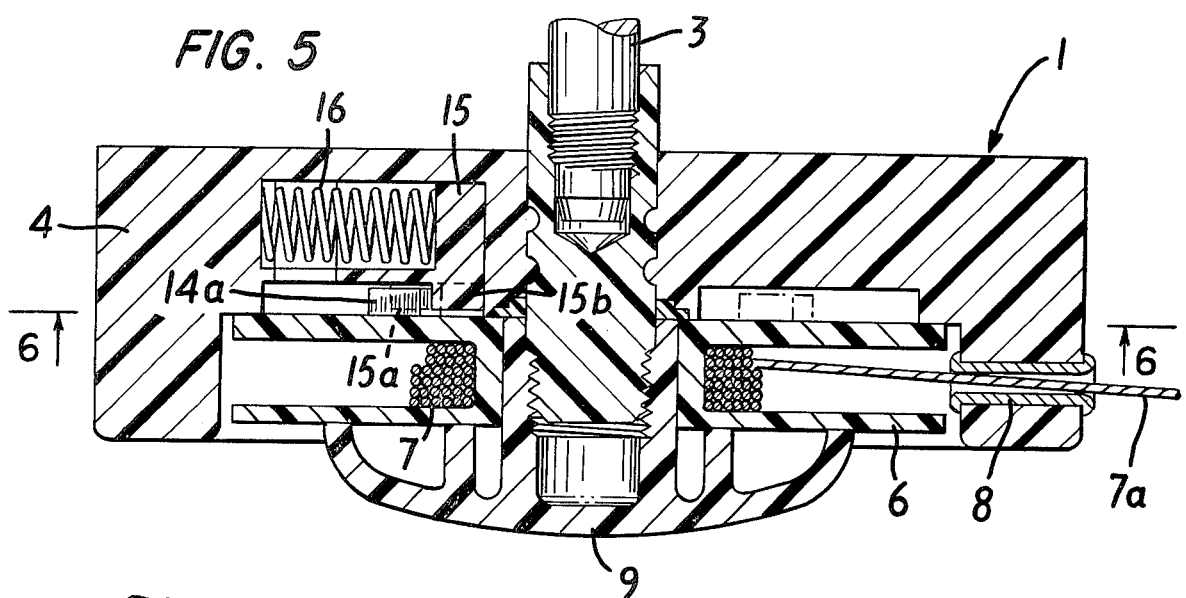
FIG. 5 is an axial section of another embodiment of the invention.
Figure 6:
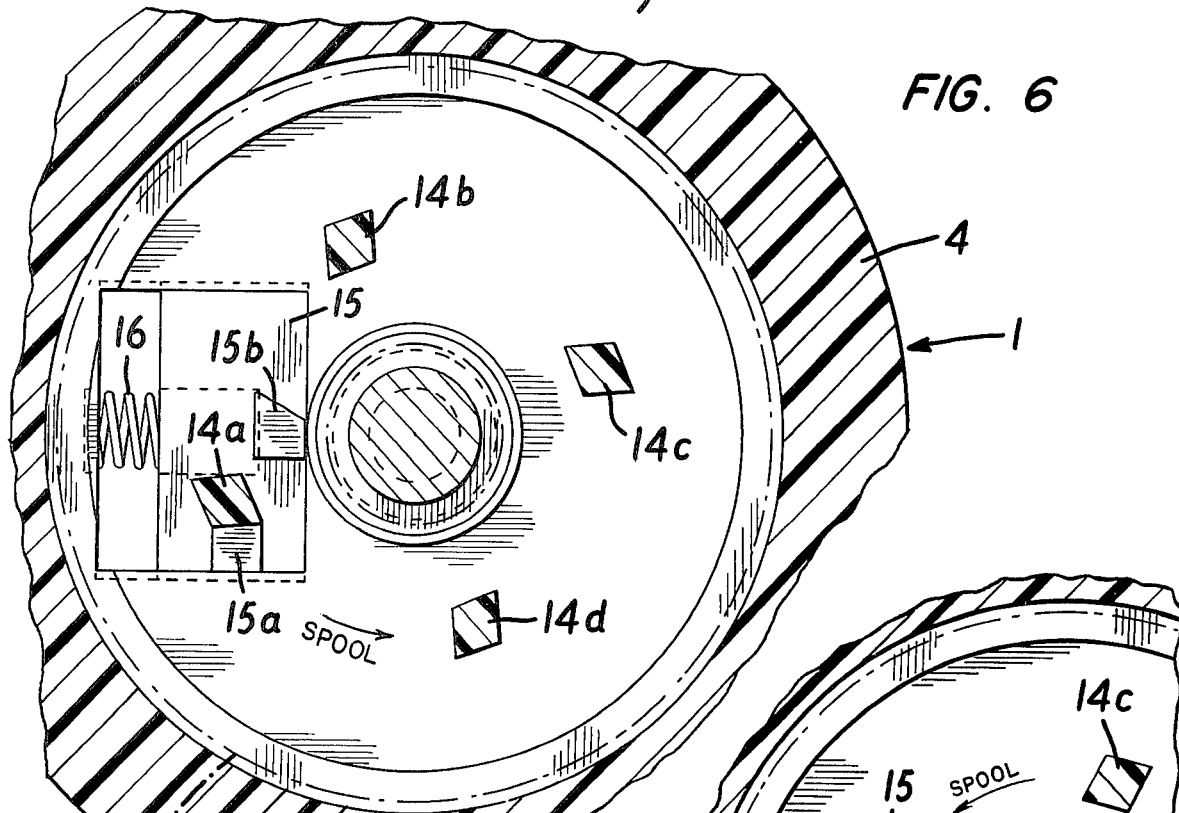
FIGS. 6 and 7 are partial cross sections taken approximately on the line 6—6 in FIG. 5 and showing different operative positions.
Figure 7:
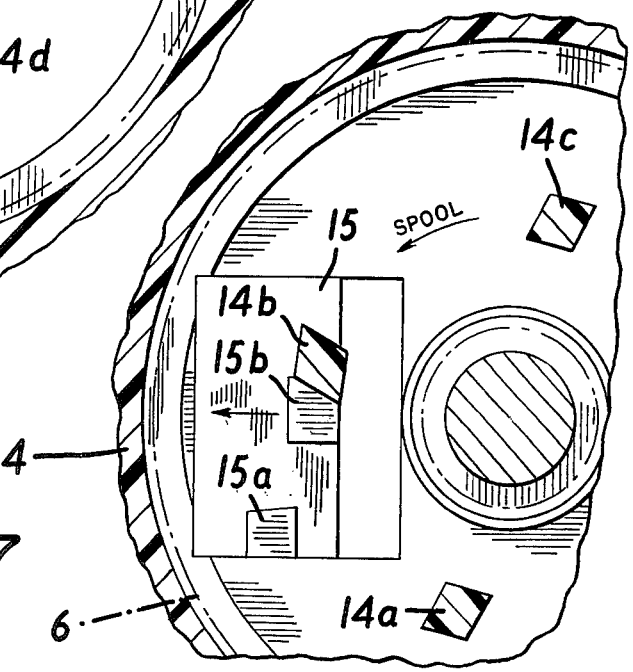

In FIGS. 5 to 7 there is shown another embodiment of the invention which is similar to that of FIGS. 1 to 4 and corresponding parts have been designated by the same reference numerals. The embodiment of FIGS. 5 to 7 differs from that of FIGS. 1 to 4 in that the two sliders 10 and 11 for controlling rotation of the filament spool relative to the casing 4 are replaced by a single slider 15 which is movable radially in a suitable recess provided in the casing 4 just above the filament spool 6 and is biased radially inwardly by a coil spring 16. The spring 16 is calibrated with respect to the weight of the slider 15 so that the slider is retained in its inner position as shown in FIG. 5 until the speed of rotation of the cutting head 1 exceeds a predetermined value for example 9,000RPM. The slider 15 is thereupon moved radially outwardly by centrifugal force.

The slider 15 is provided with two downwardly extending projections 15a and 15b which are offset relative to one another both radially and circumferentially as seen in FIG. 6. As in the embodiment of FIGS. 1 to 4, the spool 6 is provided on its upper face with a selected number of upwardly extending projections, four such projections 14a – 14d being shown by way of example.

When the cutting head 1 is rotating at normal operating speed for example below 9,000RPM, the slider 15 is in its inner position as illustrated in FIG. 6 so that the projection 15a of the slider is in the path of movement of the projections on the filament spool and hence engages one of the projections for example 14a to hold the spool from turning relative to the casing 4. If the speed of rotation of the cutting head increases above a selected speed for example 9,000RPM by reason of the projecting end portion of the filament having become shorter, the slider 15 is moved by centrifugal force to its outer position as shown in FIG. 7 whereby the projection 15a of the slider is disengaged from the projection 14a on the spool. The spool is thereby released for rotation by the pull of centrifugal force on the projecting end portion of the filament so as to feed out additional filament. However, rotation of the spool relative to the casing is limited by engagement of the next projection 14b on the spool engaging the projection 15b on the slider 15 which is not in its outer position as illustrated in FIG. 7. Hence only a predetermined amount of filament is fed out depending on the circumferential spacing of the projections on the spool. When the speed of rotation of the cutting head 1 has decreased to normal operating speed by reason of the greater load imposed by the longer projecting length of filament, the slider 15 returns to its inner position as shown in FIG. 6 so that the projection 14b on the spool is disengaged by the projection 15b on the slider and is permitted to move until it engages projection 15a. The relation shown in FIG. 6 is thereby restored except that the next projection of the spool is now in engagement with projection 15a of the slider.

Figure 8:
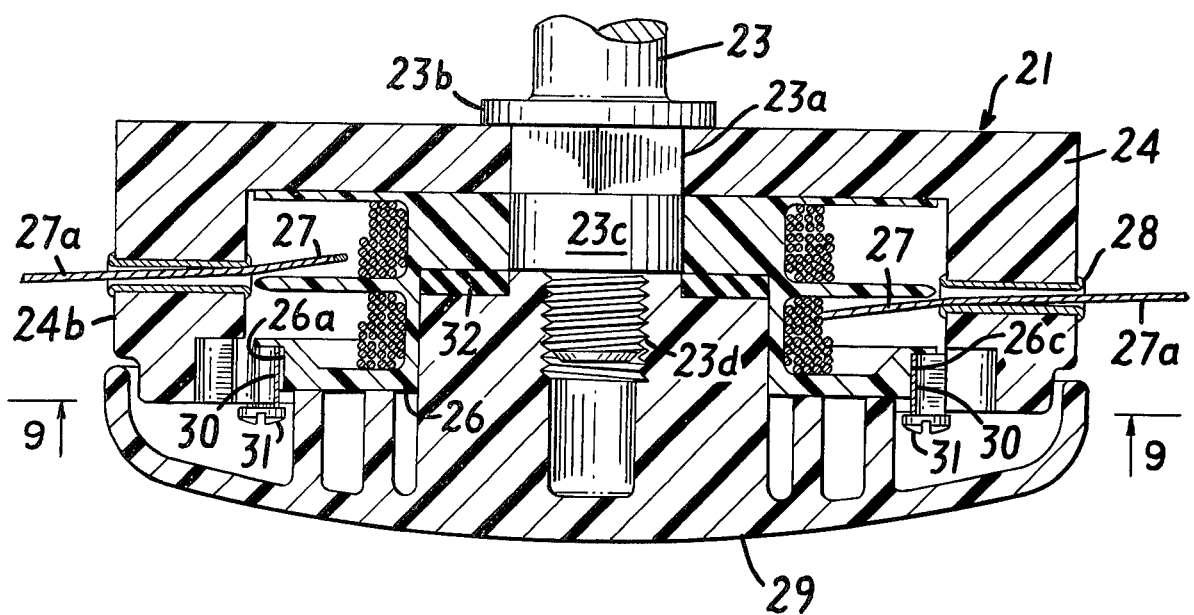
FIG. 8 is an axial section of a third embodiment.
Figure 9:
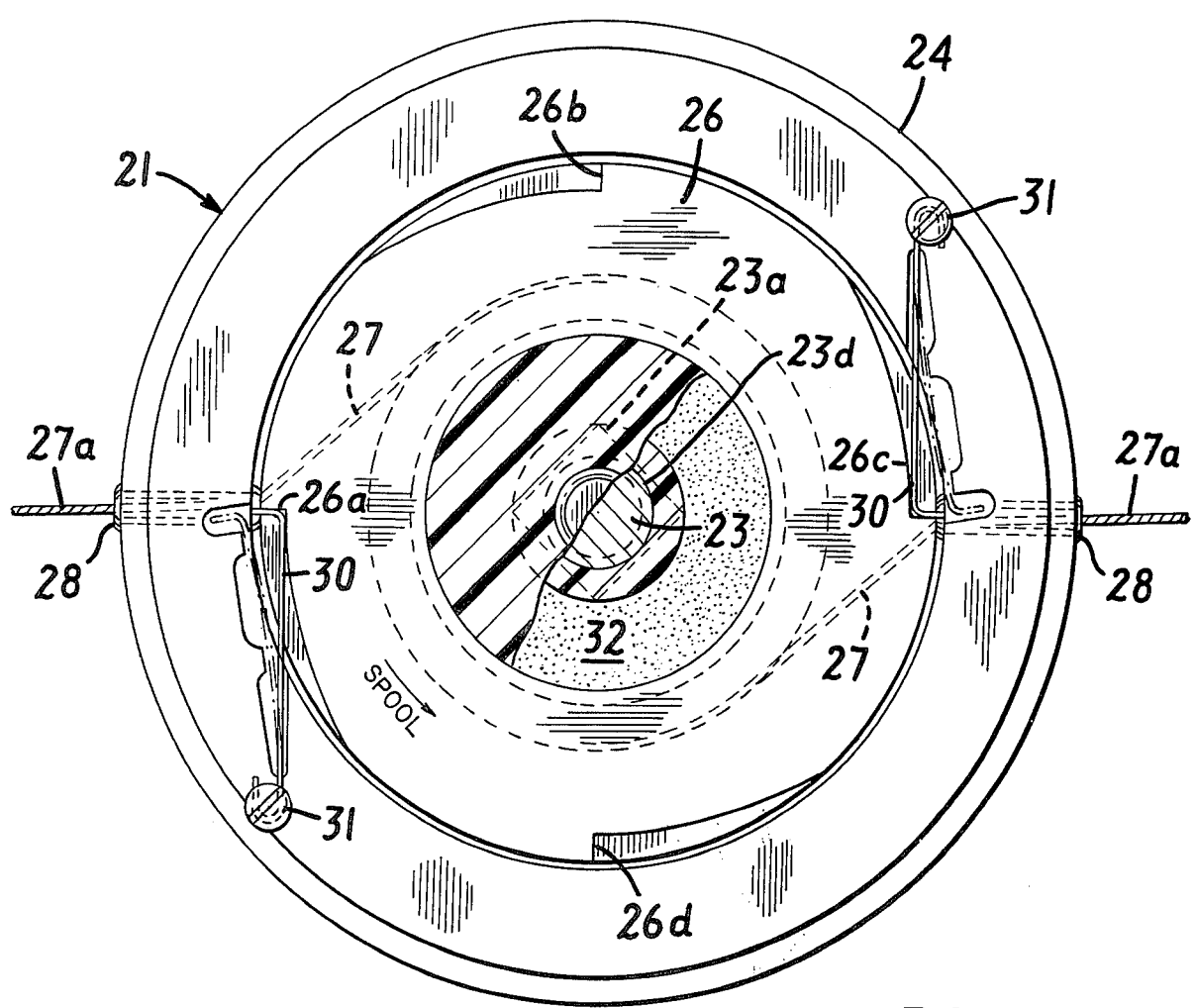
FIG. 9 is a cross section taken approximately on the line 9—9 in FIG. 8.

In FIGS. 8 and 9 there is shown another embodiment of the invention in which the cutting head 21 of the trimmer comprises a circular downwardly facing dished casing 24 which has a non-circular central hole to receive a non-circular portion 23a of the motor shaft 23 and sits against a flange 23b on the shaft. A filament spool 26 in the casing is rotatable about a circular portion 23c of the shaft 23 and is retained in the casing by a cap or cover 29 which is screwed onto a threaded portion 23d of the shaft 23 as seen in FIG. 8. The filament spool 26 has three axially spaced flanges to provide two compartments for receiving filament 27 which is wound on the spool. End portions 27a of the filaments extend out through guide eyelets 28 in the downwardly extending flange portion 24b of the casing.

The filament spool 26 is normally held against rotation relative to the casing 24 by means of spring arms 30 which are received in suitable recesses in the flange portion 14b of the casing 24 and are secured to the casing by screws 31. In normal position as shown in solid lines in FIG. 9, the spring arm 30 engage respectively in notches provided in the lower flange of the filament spool 26, four such notches 26a – 26d being shown by way of example in the drawings. When the speed of rotation of the cutting head 21 increases above a selected value, for example 9,000RPM, the spring arms 30 are flexed outwardly by centrifugal force acting on the arms to the dotted positions shown in FIG. 9. The filament spool is thereby released for rotation relative to the casing 24 so as to feed out more filament and thereby restore the normal length of the projecting end portions of the filament. The weight and spring constant of the spring arms 26 are designed so as to release the filament spool at a selected speed which is above normal operating speed.

As the spool 26 is permitted to turn relative to the casing 24 so as to feed out additional filament, the speed of rotation of the cutting head is reduced by reason of the greater load imposed on the motor by the increasing length of the filament. However, by reason of the inertia of the engine and the rotating parts, a certain amount of time is required for the cutting head to slow down. In order to avoid an excessive amount of filament being fed out before the cutting head slows down and the spring arms 30 are restored to spool-engaging position, means is provided for controlling the rate of rotation of the spool relative to the casing 24 when it is released. In the drawings such control means is shown by way of example as comprising an annular washer 32 of suitable friction material interposed between an inner portion of the spool 26 and an annular inner face of the cap 29. The washer 32 may, for example, be of a suitable elastomeric material which permits the filament spool to turn slowly with respect to the casing 24 when the spring arms 30 are released. The feeding of additional filament and slowing down of the cutting head are thereby properly coordinated so as to occur concurrently and thereby restore normal filament length and normal operating speed.

Figure 10:
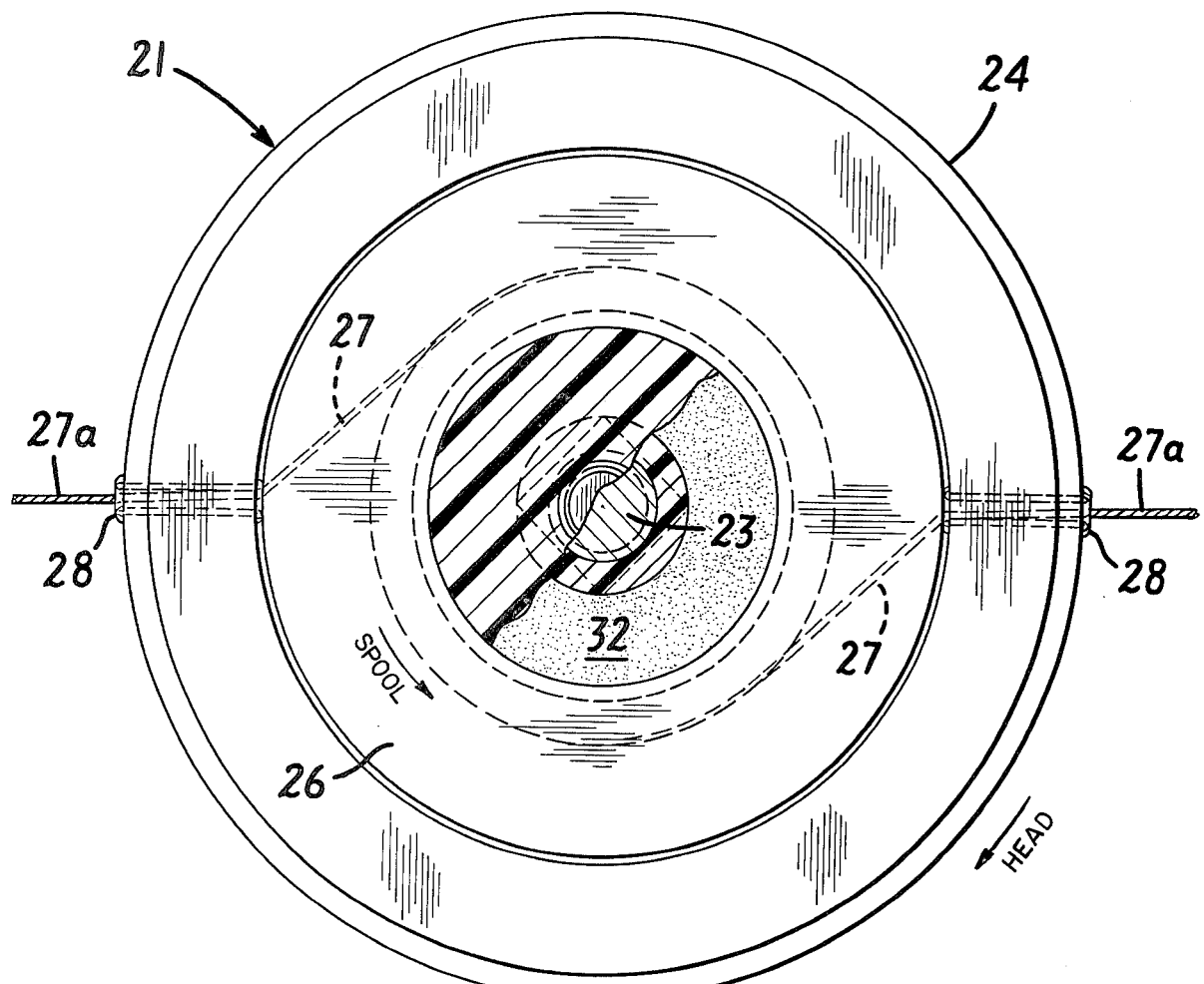
FIG. 10 is a cross section similar to FIG. 9 but illustrating a modification.

In FIG. 10 there is illustrated another embodiment of the invention which is similar to that of FIGS. 8 and 9 but functions in a somewhat different manner. Corresponding parts are designated by the same reference numerals as in FIGS. 8 and 9. The embodiment illustrated in FIG. 10 difers from that of FIGS. 8 and 9 in that the spring arms 30 and notches 26a – 26d in the spool are omitted. In normal operation the spool 26 is held from turning with respect to the casing 24 by the friction washer 32. The characteristics of the friction washer 32 are selected so as to hold the spool 26 from turning relative to the casing until the torque exerted on the spool by the pull of centrifugal force on the projecting ends of the filaments exceeds a predetermined value. Rotation of the spool relative to the casing is thereupon permitted at a controlled rate.

As has been stated above, the speed of rotation of the cutting head increases by reason of decreased load on the engine when the filament becomes shorter. By reason of the increased speed of rotation, the pull exerted by centrifugal force on the projecting ends of the filaments increases even through the length and hence the weight of the projecting end portions decrease. An example of representative values is given below.

| Filament Cutting Diameter | RPM | Pull On Filament | Spool Torque |
|---|---|---|---|
| 20 in. | 5700 | 19.6 # | 39.2 in.-lbs. |
| 18 in. | 6750 | 22.1 # | 44.8 in.-lbs. |
| 16 in. | 7700 | 23.4 # | 46.8 in.-lbs. |

It will thus be seen that when the projecting ends of the filaments become shorter by reason of tip portions being worn or broken off the speed of rotation will increase and this results in an increased torque exerted on the filament spool to turn the spool relative to the casing and thereby supply additional filament to restore normal length of the projecting end portions whereupon normal speed of rotation is restored. The friction washer 32 serves the dual function of determining the point at which slippage of the spool occurs and also the rate at which the spool is permitted to turn relative to the casing so as to provide time for the cutting head to slow down as the length of the projecting end portions of the filaments is increased.

Figure 11:
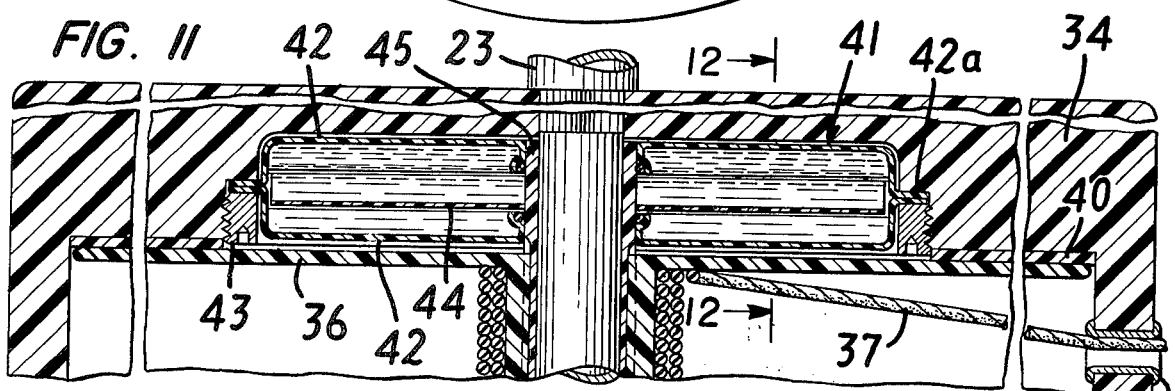
FIG. 11 is a partial axial section illustrating a further modification.
Figure 12:
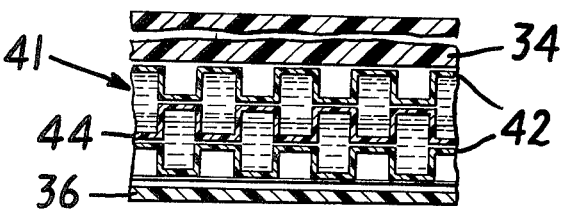
FIG. 12 is a fragmentary cross section taken approximately on the line 12—12 in FIG. 11.

In FIGS. 11 and 12 there is illustrated a further embodiment which functions in the manner of the embodiment of FIG. 10 but is of somewhat different structure. The cutting head comprises a circular casing 34 in which is rotatably mounted a filament spool 36. Filament 37 wound on the spool extends out through a guide 38 in a downwardly extending flange portion of the casing.

As in the embodiment of FIG. 10, the means for restraining rotation of the filament spool relative to the casing is torque responsive. The torque value at which slippage of the spool relative to the casing occurs is determined by a friction ring 40 between the casing and the spool. The rate at which the spool is permitted to turn relative to the casing when slippage occurs is controlled by a hydraulic torque unit 41. The unit 41 comprises a sealed annular casing 42 having radially extending corrugations in opposite sides thereof as seen in FIG. 12. The unit 41 is received in a central cavity in the casing 34 and is retained by a ring nut 43 engaging a circumferential flange 42a. A rotor 44 having radially extending corrugations is mounted on a hollow central shaft 45 which extends downwardly and has a splined lower end portion on which the spool 36 is fixed. The casing 42 is filled with suitable hydraulic fluid. The shearing of the hydraulic fluid between the casing and the rotor retards rotation of the filament spool 36.

When the cutting head rotates at normal operating speed and the projecting end portion of the filament 37 is of normal length, the friction ring 40 holds the filament spool 36 against rotation relative to the casing 34. If a tip portion of the filament becomes worn or broken off so as to reduce the length of the filament, the speed of rotation of the cutting head increases, as explained above, and the torque exerted on the spool 36 by the pull of the filament also increases so as to overcome the frictional restraint of the friction ring 30 and turn the spool relative to the casing in a direction to unwind filament from the spool. The rate at which the spool can turn is controlled by the hydraulic unit. When the spool is turned sufficiently to restore the normal length of the projecting end portion of the filament the resulting greater load on the driving motor causes the motor and cutting head to slow down. Normal speed of operation and normal length of the projecting end portion of the filament are thereby restored.

Figure 13:
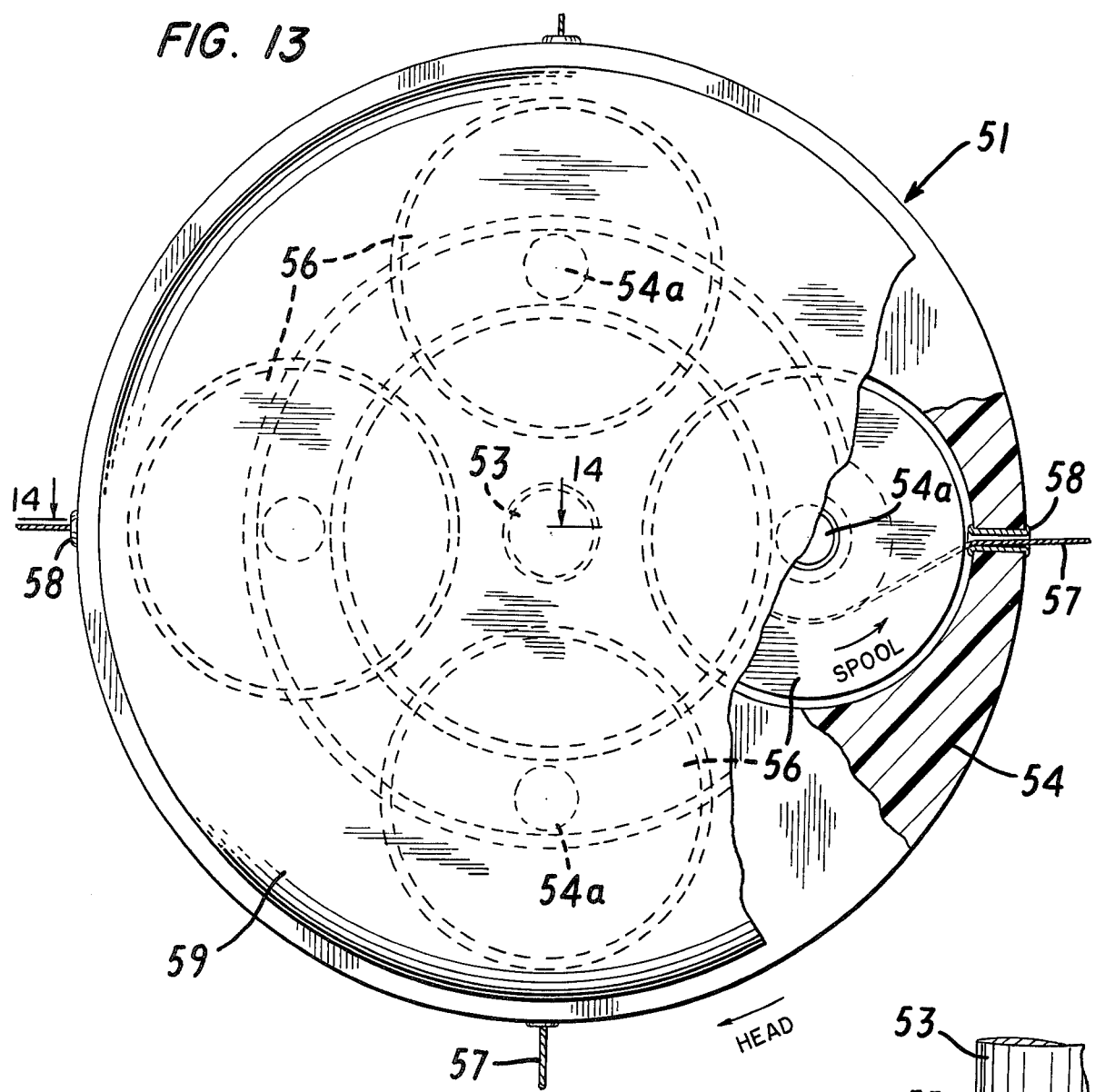
FIG. 13 is a bottom view illustrating a filament-type trimmer in accordance with the invention in which a plurality of filament spools are carried by the rotating cutting head.
Figure 14:
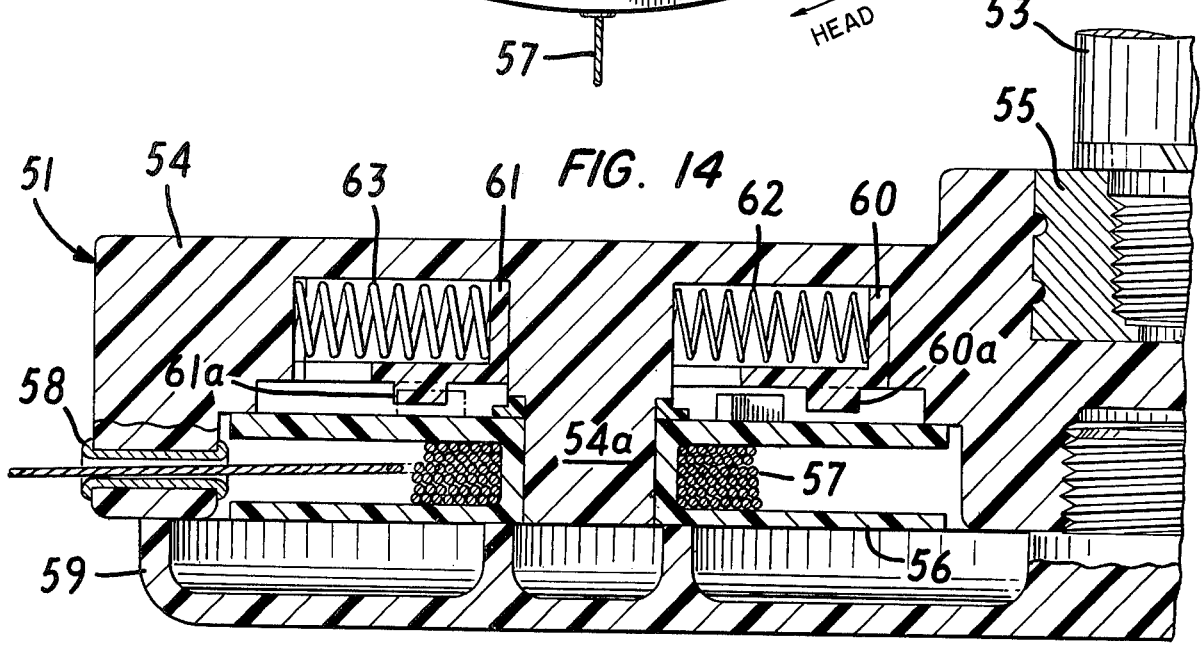
FIG. 14 is an enlarged partial section taken approximately on the line 14—14 in FIG. 13, and FIG. 15 are curves which are useful in explaining the operation of a filament-type trimmer in accordance with the present invention.

Instead of the cutting head having a single filament spool as in the embodiments illustrated in FIGS. 1 to 12 it may carry a plurality of spools. Such a construction is illustrated by way of example in FIGS. 13 and 14 in which the cutting head 51 comprises a casing 54 with four filament spools 56 rotatably mounted in the casing. Each of the spools is rotatable about a stud portion 54a of the casing and a filament 57 wound on each spool extends out through a guide 58 in a downwardly projecting flange portion of the casing. The spools are retained in the casing by a cover 59 having a threaded stud portion which screws into a central threaded hole of the casing. The casing is conveniently molded of plastic material and is secured to the drive shaft 53 of the engine by means of an internally threaded metal bushing 55 which is molded into the casing.

Rotation of each of the filament spools relative to the casing is controlled by a low speed slide 60 and a high speed slide 61 in the same manner as described with respect to the embodiment of FIGS. 1 to 4. The slides 60 and 61 are provided respectfully with springs 62 and 63. However, since the spools in effect orbit about the axis of shaft 53 rather about their own axes, the springs 62 and 63 act in a direction to bias the slider 60 and 61 toward the central axis of the casing so as to oppose centrifugal force which acts on the slider when the casing 54 rotates. The sliders 60 and 61 have downwardly extending projections 60a and 61a which are engageable with projections provided on the upper face of the spool in the same manner as decribed above with reference to FIGS. 1 to 4. Thus the spools 56 are normally held against rotation. When the projecting portions of the filaments become shorter the speed of rotation of the cutting head increases whereupon controlled rotation of the spools is permitted as described above to feed out more filament and thereby restore normal filament length and normal operating speed.

Figure 15:
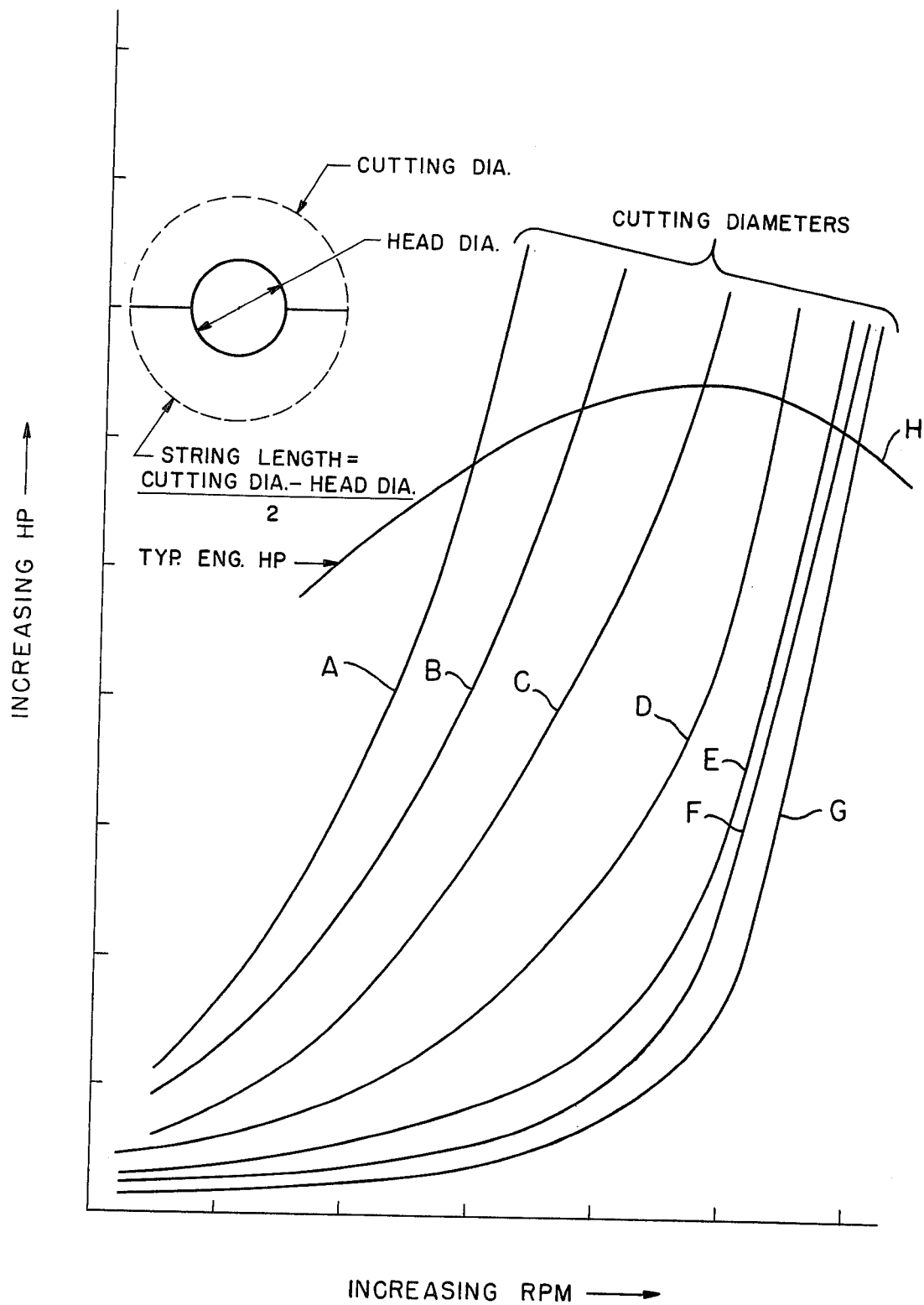

FIG. 15 shows a family of speed-horsepower curves. Curves A to G indicates the power required to drive the cutting head at different speeds with different cutting diameters. Curve H is a typical engine horsepower curve. The intersection of curve H with curves A–G indicates the increase in the speed of rotation that can be expected with change of cutting diameter as represented by filament length. It will thus be seen that when cutting diameter decreases the speed of rotation increases. It is this increase in the speed of rotation which is utilized automatically to permit additional filament to be fed out so as to restore normal cutting diameter and normal speed.

It will be understood that so far as they are compatible the various features of the several embodiments illustrated in the drawings are mutually interchangeable with one another. For example, the various means illustrated for controlling rotation of the filament spool in single spool cutting heads are likewise applicable to multiple spool cutting heads. Moreover, since various modifications and variations may be made the invention is in no way limited to the particular embodiments shown by way of example in the drawings and herein particularly described. What I claim is:

1. A filament-type trimmer comprising a rotatable housing, at least one spool rotatably supported by said housing, at least one filament wound on said spool, guide means on said housing past which an end portion of said filament extends in passing from said spool to the exterior of said housing whereby said end portion of said filament is extended from said housing by centrifugal force to act as rotary cutting means upon rotation of said housing at sufficient speed, means for rotationally driving said housing, said driving means having such speed-load characteristics that the speed of rotation increases with a decrease in load, means for normally restraining rotation of said spool relative to said housing and responsive to centrifugal force upon increase in the speed of rotation of said housing upon decrease in load on said driving means upon decrease in length of the extended end portion of said filament to release said spool for rotation relative to said housing by the pull exerted by centrifugal force on said extended end portion of said filament to thereby increase the length of said extended end portion of said filament.

2. A filament-type trimmer according to claim 1, in which said means normally restraining rotation of said spool relative to said housing comprises catch means normally holding said spool against rotations relative to said housing and releasable by centrifugal force to permit rotation of said spool relative to said housing to feed out additional filament.

3. A filament-type trimmer according to claim 2, comprising means for limiting the amount of additional filament fed out upon release of said catch means to a predetermined increment.

4. A filament-type trimmer according to claim 3, comprising means for delaying the feeding out of an additional increment of filament after release of said catch means until the speed of rotation of said housing has been decreased below normal speed of operation.

5. A filament-type trimmer according to claim 2, comprising means for retarding rotation of said spool relative to said housing to coordinate the feeding of additional filament with reduction of speed of said housing due to increase of load on said driving means due to the increased length of said extended end portion of said filament.

6. A filament-type trimmer according to claim 4, in which said means normally restraining rotation of said spool relative to said housing comprises torque responsing means which holds said spool against rotation relative to said housing until the torque acting on said spool by the pull exerted by centrifugal force acting on said extended end portion of said filament exceeds a predetermined value.

7. A filament-type trimmer according to claim 6, in which said torque-responsive means comprises interengaging friction surfaces on said spool and said housing.

8. A filament-type trimmer according to claim 6, comprising means for retarding rotation of said spool relative to said housing to coordinate the feeding of additional filament with reduction of speed of said housing due to increase of load on said driving means due to increase in length of said extended end portion of said filament.

* * * * *